United States Patent
Shehzad et al.

(10) Patent No.: US 12,506,521 B2
(45) Date of Patent: Dec. 23, 2025

(54) METHOD FOR DATA AUGMENTATION FOR CHANNEL STATE INFORMATION FEEDBACK

(71) Applicant: Nokia Technologies Oy, Espoo (FI)

(72) Inventors: Muhammad Karam Shehzad, Massy (FR); Fanny Jardel, Massy (FR); Luca Rose, Massy (FR); Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 110 days.

(21) Appl. No.: 18/399,306

(22) Filed: Dec. 28, 2023

(65) Prior Publication Data

US 2024/0259058 A1 Aug. 1, 2024

(30) Foreign Application Priority Data

Jan. 30, 2023 (FI) .................................... 20235082

(51) Int. Cl.
*H04B 7/02* (2018.01)
*H04B 7/0456* (2017.01)
*H04B 17/309* (2015.01)

(52) U.S. Cl.
CPC ......... *H04B 7/0456* (2013.01); *H04B 17/309* (2015.01)

(58) Field of Classification Search
CPC .... H04B 7/0456; H04B 17/309; G06N 3/045; G06N 3/047; G06N 3/088; H04L 25/0224; H04L 25/0254

USPC .......................................................... 375/267
See application file for complete search history.

(56) References Cited

U.S. PATENT DOCUMENTS

| | | | |
|---|---|---|---|
| 12,323,210 B2* | 6/2025 | Li | H04B 17/3913 |
| 2009/0209206 A1* | 8/2009 | Zou | H04B 7/0421 455/59 |
| 2017/0134082 A1 | 5/2017 | Onggosanusi et al. | |
| 2017/0222703 A1* | 8/2017 | Thomas | H04B 17/24 |
| 2021/0273707 A1 | 9/2021 | Yoo et al. | |
| 2022/0278728 A1 | 9/2022 | Vankayala et al. | |
| 2022/0353155 A1 | 11/2022 | Ma et al. | |

FOREIGN PATENT DOCUMENTS

| | | |
|---|---|---|
| WO | 2022/013095 A1 | 1/2022 |
| WO | 2022/066843 A1 | 3/2022 |
| WO | 2022/141397 A1 | 7/2022 |

OTHER PUBLICATIONS

"5G/NR—CSI RS Codebook", ShareTechnote, Retrieved on Jan. 25, 2024, Webpage available at : https://www.sharetechnote.com/html/5G/5G_CSI_RS_Codebook.html.

(Continued)

*Primary Examiner* — Helene E Tayong
(74) *Attorney, Agent, or Firm* — Barta Jones, PLLC

(57) ABSTRACT

A method and apparatus for data augmentation for channel state information feedback is provided. The apparatus is caused to receive, from a network node, a request for training data for data augmentation algorithm and transmit, to the network node, a first part of a plurality of parts of the training data with properties of data in the first part of the training data reflecting distribution of the training data.

15 Claims, 7 Drawing Sheets

(56) References Cited

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-228.

Shehzad et al., "Dealing with CSI compression to reduce losses and overhead: An artificial intelligence approach", IEEE International Conference on Communications Workshops (ICC Workshops), Jun. 14-23, 2021, 6 pages.

Wen et al., "Deep learning for massive MIMO CSI feedback", IEEE Wireless Communications Letters, vol. 7, No. 5 Oct. 2018, pp. 748-751.

Shehzad et al., "ML-Based Massive MIMO Channel Prediction: Does It Work on Real-World Data?", IEEE Wireless Communications Letters, vol. 11, No. 4, Apr. 2022, pp. 811-815.

Shorten et al., "A survey on image data augmentation for deep learning", Journal of Big Data, vol. 6, Article No. 60, 2019, pp. 1-48.

Liang et al., "Wireless Channel Data Augmentation for Artificial Intelligence of Things in Industrial Environment Using Generative Adversarial Networks", IEEE 18th International Conference on Industrial Informatics (INDIN), Jul. 20-23, 2020, pp. 502-507.

Yean et al., "GAN+: Data Augmentation Method using Generative Adversarial Networks and Dirichlet for Indoor Localisation", CEUR Workshop Proceedings, Nov. 29-Dec. 2, 2021, 16 pages.

"SOD on Use Cases for SI on Data Collection", 3GPP TSG-RAN WG3 #110-e, R3-206874, Agenda: 18.3, Huawei, Nov. 2-12, 2020, 17 pages.

Office action received for corresponding Finnish Patent Application No. 20235082, dated Jun. 21, 2023, 14 pages.

Extended European Search Report received for corresponding European Patent Application No. 23220836.3, dated Jul. 16, 2024, 11 pages.

Davaslioglu et al., "End-to-End Autoencoder Communications with Optimized Interference Suppression", arXiv, Dec. 29, 2021, pp. 1-12.

* cited by examiner

METHOD FOR DATA AUGMENTATION FOR CHANNEL STATE INFORMATION FEEDBACK

FIELD

Various example embodiments relate to data augmentation for channel state information feedback.

BACKGROUND

Channel estimation may be used to enhance operation of wireless communication systems. Channel estimation may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to channel estimation. According to the discussions there is a need to provide enhanced methods, apparatuses and computer programs related to channel estimation in cellular communication networks. Such enhancements may also be beneficial in other wireless communication networks, such as in 6G networks in the future, as well.

Background Artificial intelligence (AI) and machine learning (ML) based methods have been considered at both ends of the communication system, that is, at the network node and UE, to improve the precision of channel state information (CSI) acquired at the network node.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to an aspect, there is provided a method comprising: receiving, by a user equipment from a network node, a request for training data for data augmentation algorithm; transmitting, to the network node, a first part of a plurality of parts of the training data, wherein properties of data in the first part of the training data reflect distribution of the training data; wherein the method comprises either: i) computing a first set of precoding matrix indices based on the training data; receiving, from the network node, a second set of precoding matrix indices computed based on data samples generated by the network node based on the first part of the training data transmitted to the network node; comparing the first set of precoding matrix indices and the second set of precoding matrix to verify the data samples generated by the network node; and based on determining that a number of indices of the second set of precoding matrix indices verified as correct remains below a pre-set threshold, transmitting a second part of the plurality of parts of the training data to the network node; or the method comprises ii) before transmitting the first part of the training data, generating data samples based on one or more parts of the plurality of parts of the training data, wherein properties of data in the one or more parts reflect distribution of the training data; verifying the generated data samples; iteratively repeating generating the data samples and verifying the generated data samples to determine a suitable number of the one or more parts of the training data to enable generation of a desired set of training data; and wherein the first part of the training data to be transmitted to the network node comprises the suitable number of the one or more parts of the training data.

According to an embodiment, the training data is generated by the user equipment using a known channel estimation algorithm.

According to an embodiment, the method comprises: transmitting, to the network node, an acknowledgement that the apparatus has training data available.

According to an embodiment, the method comprises: dividing the training data into the plurality of parts such that properties of data in the plurality of parts, e.g. in each part of the plurality of parts, reflect distribution of the training data.

According to an embodiment, the option i) of the method comprises: based on determining that a number of indices of the second set of precoding matrix indices verified as correct reaches a pre-set threshold, transmitting an acknowledgement to the network node that the data samples generated by the network node are correct.

According to an embodiment, the option i) of the method comprises: receiving, from the network node, a third set of precoding matrix indices computed based on data samples generated by the network node based on the first part and the second part of the training data transmitted to the network node; comparing the third set of precoding matrix indices and corresponding precoding matrix indices computed by the apparatus to verify the data samples generated by the network node; based on determining that a number of indices of the third set of precoding matrix indices verified as correct remains below a pre-set threshold, transmitting a further part of the one or more parts of the training data to the network node.

According to an embodiment, in the option i) of the method, the first part comprises more data samples than the second part.

According to an embodiment, in the option ii of the method, the generating the data samples is performed using a generative adversarial network, GAN; and wherein the apparatus and the network node have agreed on using twin GAN.

According to an aspect, there is provided an apparatus comprising means for performing the method of the aspect above and any of the embodiments thereof.

According to an embodiment, the means comprises at least one processor; and at least one memory storing instructions that, when executed by the at least one processor, cause the performance of the apparatus.

According to an aspect, there is provided a (non-transitory) computer readable medium comprising instructions that when executed by an apparatus, cause the apparatus to perform the method of the aspect above and any of the embodiments thereof.

According to an aspect, there is provided a computer program comprising instructions, which, when executed by an apparatus, cause the apparatus to perform the method of the aspect above and any of the embodiments thereof.

According to an aspect, there is provided a method comprising: transmitting, by a network node to a user equipment, a request for training data for data augmentation algorithm; receiving, from the user equipment, a first part of a plurality of parts of the training data, wherein properties of data in the first part of the training data reflect distribution of the training data; wherein the apparatus is caused to perform either: i) generating data samples based on the received part of the training data; computing a set of precoding matrix indices based on the generated data samples; transmitting the set of precoding matrix indices to the user equipment; receiving a second part of the plurality of parts of the training data from the user equipment; or ii) wherein the received part of the training data comprises a suitable number of parts of the training data generated and verified by the user equipment, wherein the suitable number of parts of the training data enables the apparatus to generate a desired set of data using the data augmentation algorithm.

According to an embodiment, the method comprises: receiving, from the user equipment, an acknowledgement that the user equipment has training data available.

According to an embodiment, the generating the data samples is performed using a generative adversarial network, GAN.

According to an embodiment, the method i) of the method comprises: transmitting a pre-set threshold defining a number of indices of the set of precoding matrix indices that is to be verified as correct.

According to an embodiment, the method i) of the method comprises: receiving an acknowledgement from the user equipment that the data samples generated by the network node are correct; and training a machine learning model for a target goal with the data samples.

According to an embodiment, the method i) of the method comprises: generating further data samples based on the second part of the training data; computing a further set of precoding matrix indices based on the further data samples; transmitting the further set of precoding matrix indices to the user equipment; and repeating the steps of generating, computing and transmitting until receiving an acknowledgement from the user equipment that the data samples generated by the network node are correct.

According to an embodiment of the option ii) of the method, the apparatus and the user equipment have agreed on using twin GAN, and the apparatus is caused to perform: generating the desired set of data based on the suitable number of parts of the training data; training a machine learning model for a target goal using the desired set of training data.

According to an aspect, there is provided an apparatus comprising means for performing the method of the aspect above and any of the embodiments thereof.

According to an embodiment, the means comprises at least one processor; and at least one memory storing instructions that, when executed by the at least one processor, cause the performance of the apparatus.

According to an aspect, there is provided a (non-transitory) computer readable medium comprising instructions that when executed by an apparatus, cause the apparatus to perform the method of the aspect above and any of the embodiments thereof.

According to an aspect, there is provided a computer program comprising instructions, which, when executed by an apparatus, cause the apparatus to perform the method of the aspect above and any of the embodiments thereof.

BRIEF DESCRIPTION OF THE DRAWINGS

Some example embodiments will now be described with reference to the accompanying drawings.

DETAILED DESCRIPTION

Figure 1:
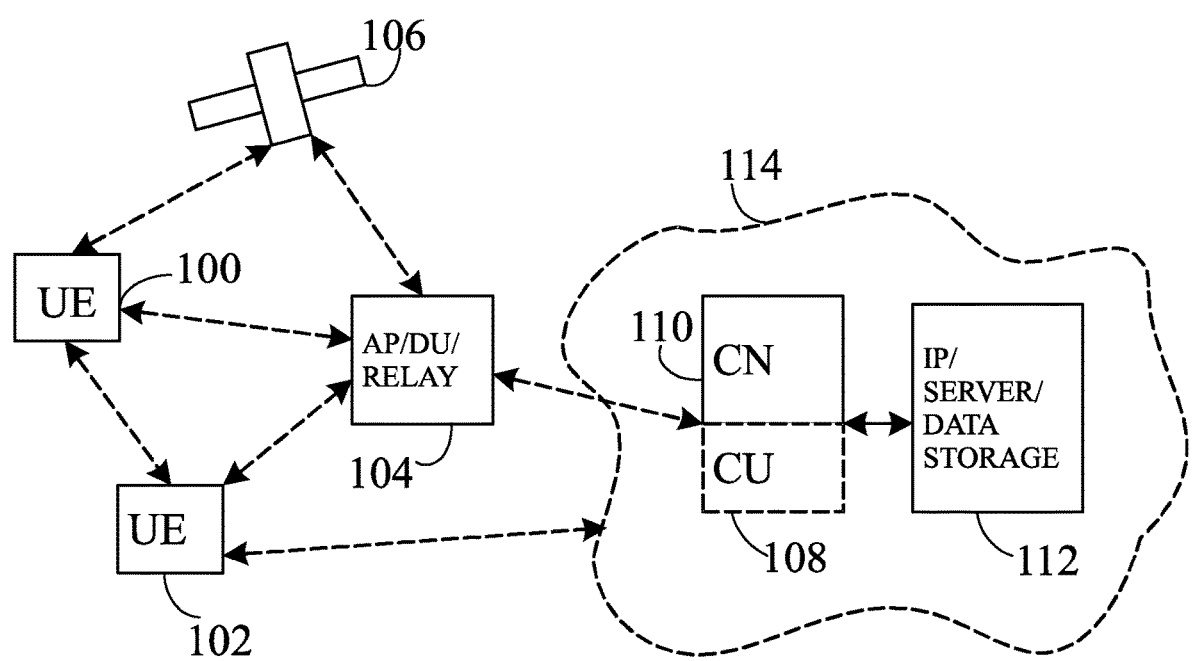
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

MIMO regime may require channel state information (CSI) to benefit from spatial diversity and multiplexing gains. UE may report its measurement results on radio channel quality via CSI, for example. Two different strategies may be considered for CSI feedback: type I and type II CSI feedback. These strategies exploit codebooks to feedback CSI to a network node, e.g. gNB. Codebook is a set of pre-set precoding matrices. Precoding matrix indicator (PMI) is computed by correlating the estimated CSI with codebook entries, and the PMI giving the maximum correlation may be reported from the codebook. Such CSI reporting is compressed and may yield inaccurate CSI at the network node. Compressed CSI may also comprise channel quality index (CQI) from the codebook, and possibly other parameters as well.

To acquire CSI at the network node, the channel may be estimated by the UE based on CSI reference symbols (CSI-RS) transmitted by the network node. Once the channel is estimated, the UE may report, for example a PMI and CQI from the codebook, which is known at the network node and the UE. Compression of CSI estimated at the UE may reduce over-the-air (OTA) overhead, but may reduce precision of CSI and thereby impact the performance of MIMO precoding.

Artificial intelligence (AI) and machine learning (ML)-based methods have been considered at both ends of the communication system, that is, at the network node and UE, to improve the precision of the CSI acquired at the network node. Methods are based on predicting the CSI by a channel predictor, and if the prediction is good enough, UE might not need to report any CSI feedback. However, large amount of identical, or nearly identical, training data is required at both ends to perform ML-based CSI prediction. Reporting large amounts of training data from the UE to the network node causes OTA overhead.

There is provided a data augmentation technique for having identical, or nearly identical, training data for ML-based CSI prediction at both ends, that is, at the UE and the network node at minimum OTA overhead.

Data augmentation is a process to increase the amount of training data, wherein copies of already existing training data are modified and this modified data is added to the existing data set. Alternatively, new synthetic data may be created or generated based on the existing data. Modification of data may comprise, for example, random cropping, shearing, rotation, flipping, adding Gaussian noise, and colour shifting.

Figure 2:
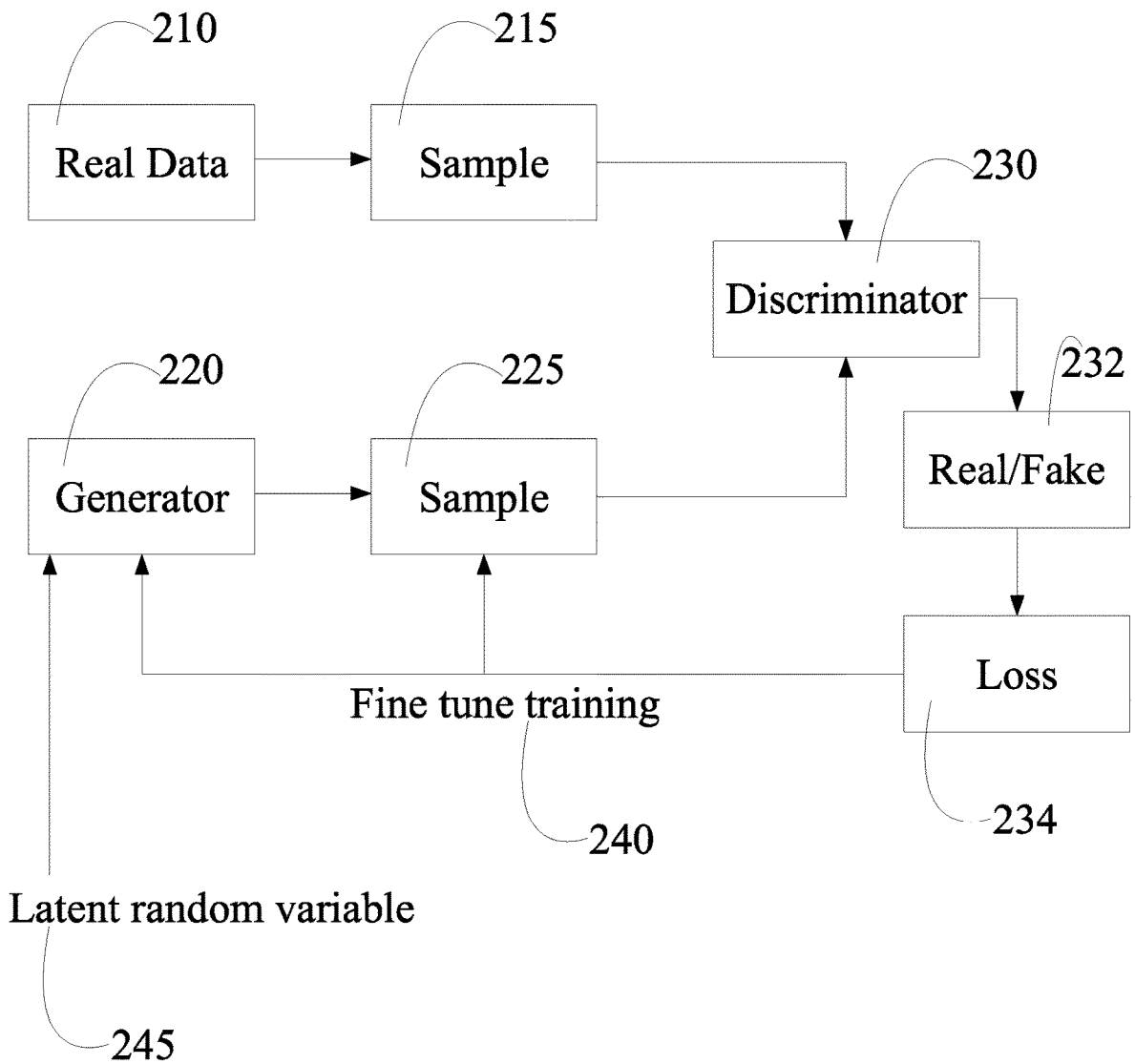
FIG. 2 shows, by way of example, data generation using generative adversarial network.

FIG. 2 shows, by way of example, data generation using generative adversarial network (GAN). GAN employs an ML algorithm for generating new data by using existing data and random noise. When considering CSI as an example, the new data may be generated by flipping the existing CSI. GAN comprises two stages: a generator 220 and a discriminator 230.

The generator 220 generates new data samples 225 by employing latent random variables 245 and trying to replicate a particular type of distribution via fine tune training 240. Distribution of the latent random variables may be a Gaussian distribution, for example.

The discriminator 230 verifies the newly generated data samples 225 by comparing them with existing data samples 215 of real data 210. Discriminator 230 tries to distinguish 232 between the real samples 215 and the fake samples 225. The generator 220 tries to minimize the loss 234 and the discriminator 230 tries to maximize the loss 234.

Figure 3:
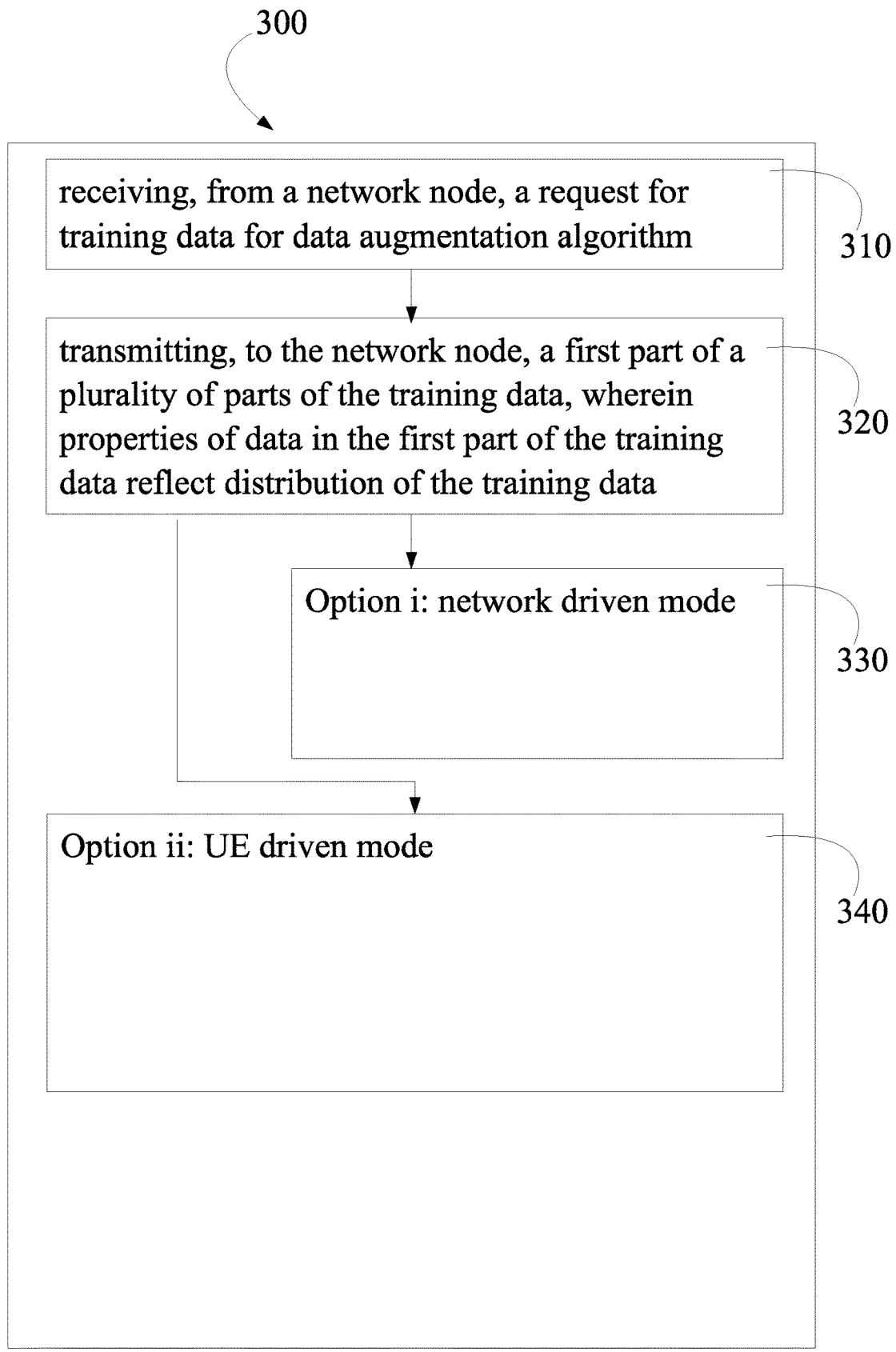
FIG. 3 shows, by way of example, a flowchart of a method.

FIG. 3 shows, by way of example, a flowchart of a method. The phases of the illustrated method may be performed by a UE, or by a control device configured to control the functioning thereof, when installed therein. The UE may be, for example, the device 550 of FIG. 5, or the device 650 of FIG. 6, which is configured to perform at least the method 300. The method 300 comprises receiving 310, from a network node, a request for training data for data augmentation algorithm. The method 300 comprises transmitting 320, to the network node, a first part of a plurality of parts of the training data, wherein properties of data in the first part of the training data reflect distribution of the training data. The method 300 comprises either option i 330, which may be referred to a as a network driven mode, or option ii 340, which may be referred to as an UE driven mode.

In option i 330, the method 300 comprises: computing a first set of precoding matrix indices based on the training data; receiving, from the network node, a second set of precoding matrix indices computed based on data samples generated by the network node based on the first part of the training data transmitted to the network node; comparing the first set of precoding matrix indices and the second set of precoding matrix to verify the data samples generated by the network node; and based on determining that a number of indices of the second set of precoding matrix indices verified as correct remains below a pre-set threshold, transmitting a second part of the plurality of parts of the training data to the network node. Option i is further described in the context of FIG. 5.

In option ii 340, the method 300 comprises: before transmitting the first part of the training data, generating data samples based on one or more parts of the plurality of parts of the training data, wherein properties of data in the one or more parts reflect distribution of the training data; verifying the generated data samples; iteratively repeating generating the data samples and verifying the generated data samples to determine a suitable number of the one or more parts of the training data to enable generation of a desired set of training data; and wherein the first part of the training data to be transmitted to the network node comprises the suitable number of the one or more parts of the training data. Option ii is further described in the context of FIG. 6.

Figure 4:
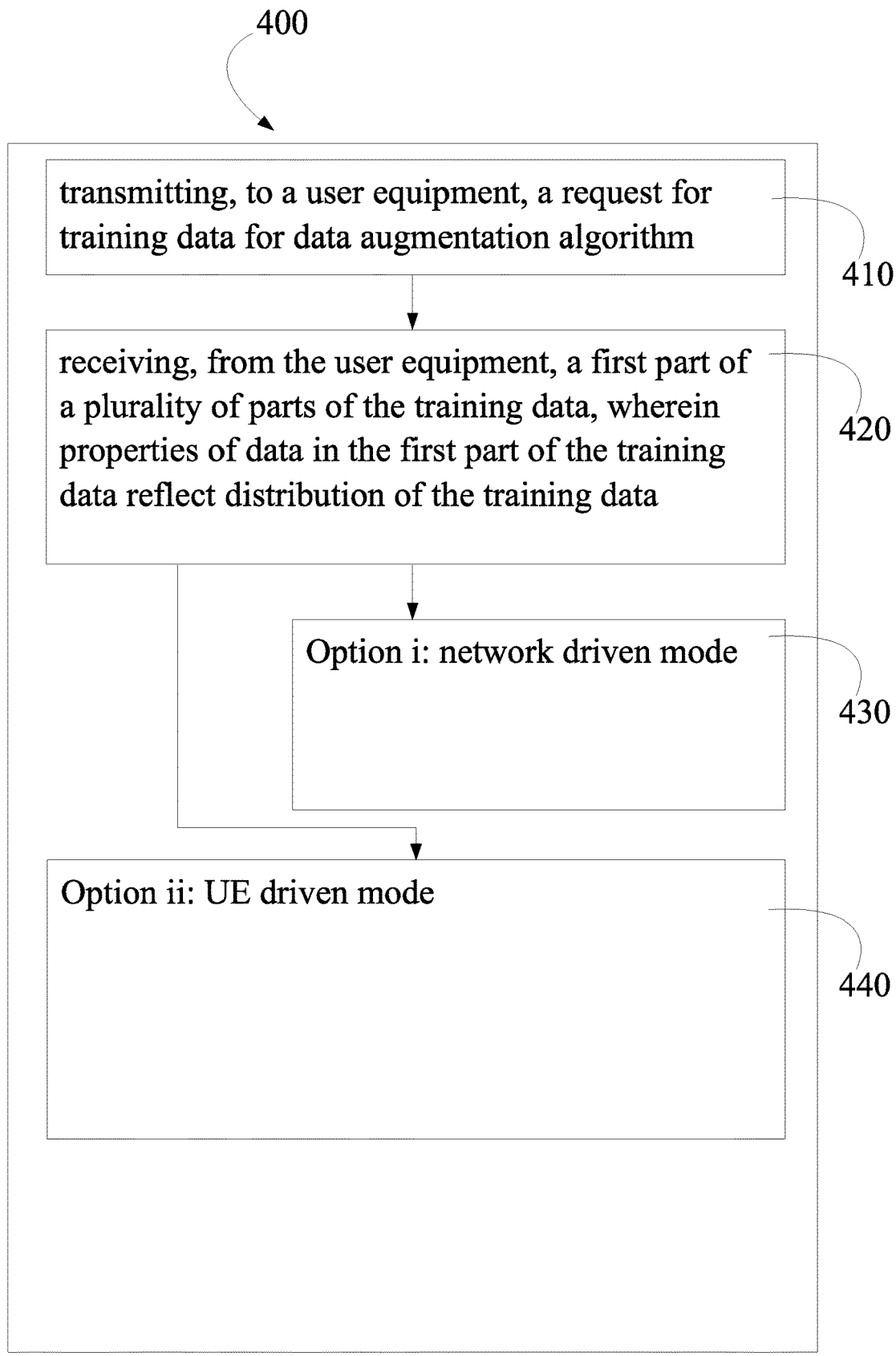
FIG. 4 shows, by way of example, a flowchart of a method.

FIG. 4 shows, by way of example, a flowchart of a method. The phases of the illustrated method may be performed by a network node, or by a control device configured to control the functioning thereof, when installed therein. The network node may be, for example, the device 510 of FIG. 5, or the device 610 of FIG. 6, which is configured to perform at least the method 400. The method 400 comprises transmitting 410, to a user equipment, a request for training data for data augmentation algorithm. The method 400 comprises receiving 420, from the user equipment, a first part of a plurality of parts of the training data, wherein properties of data in the first part of the training data reflect distribution of the training data. The method 400 comprises either option i 430, which may be referred to a as a network driven mode, or option ii 440, which may be referred to as an UE driven mode.

In option i 430, the method 400 comprises: generating data samples based on the received part of the training data; computing a set of precoding matrix indices based on the generated data samples; transmitting the set of precoding matrix indices to the user equipment; receiving a second part of the plurality of parts of the training data from the user equipment. Option i is further described in the context of FIG. 5.

In option ii 440, the method 400 comprises: wherein the received part of the training data comprises a suitable number of parts of the training data generated and verified by the user equipment, wherein the suitable number of parts of the training data enables the apparatus to generate a desired set of data using the data augmentation algorithm. Option ii is further described in the context of FIG. 6.

The method(s) as disclosed herein enable having identical or nearly identical training data at the network node and at the UE with reduced OTA overhead. Reduced overhead is achieved by not transmitting the entire training data from the UE to the network. The network node and the UE may train an ML model for a target goal with identical or nearly identical training data at both ends. For example, the network node and the UE may train channel predictors for CSI feedback.

The methods 300, 400 and at least some embodiments of the methods, will be described in more detail in the context of the signalling diagrams of FIG. 5 and FIG. 6.

Figure 5:
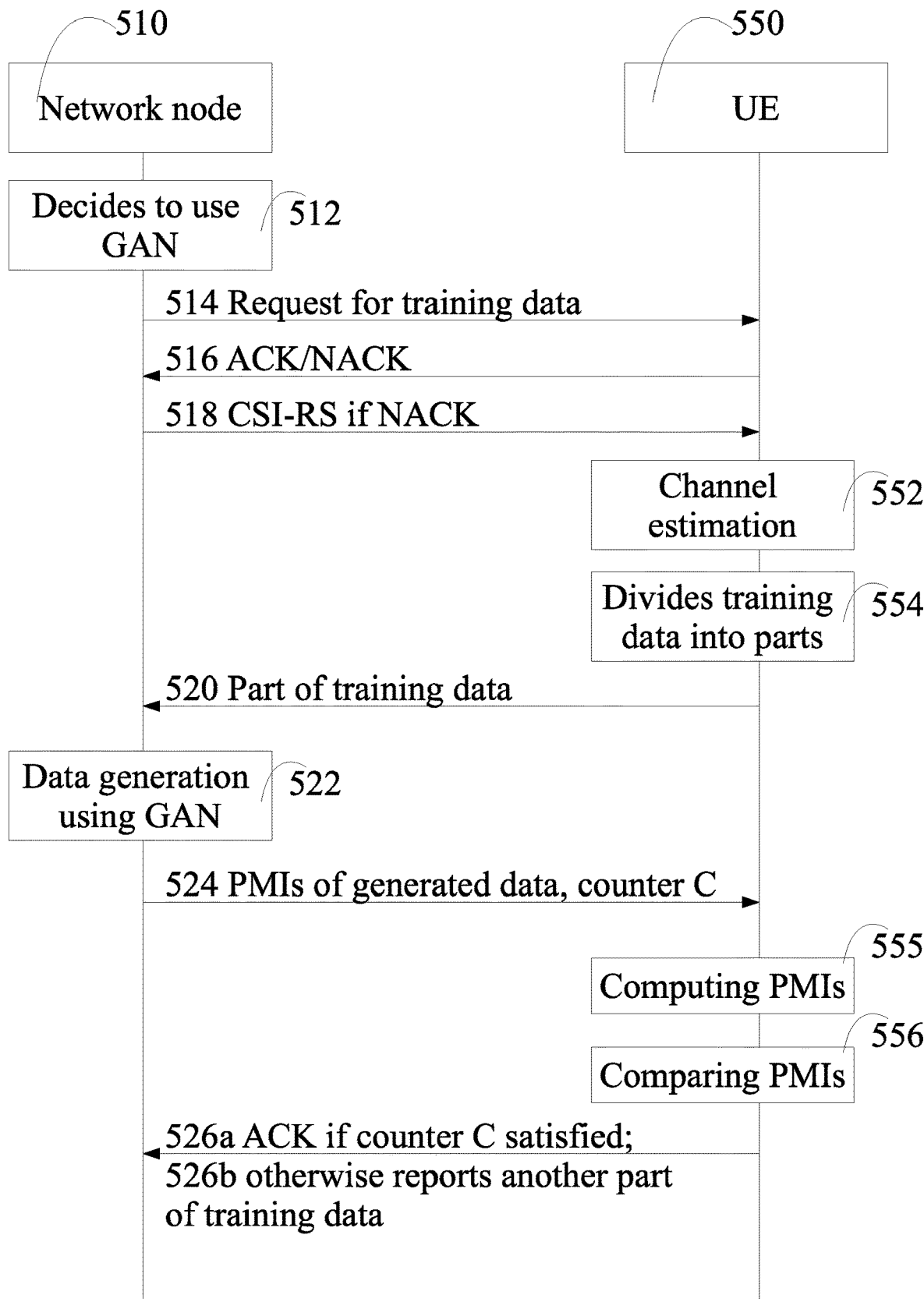
FIG. 5 shows, by way of example, signalling between entities.

FIG. 5 shows, by way of example, signalling between entities. Network node 510, e.g. gNB, may decide 512 to use data augmentation algorithm, e.g. GAN, at its end. The network node 510 may transmit 514 to the UE 550 a request for training data for data augmentation algorithm. The network node 510 may request, for example, initial samples of the data, which may be compressed or uncompressed, depending on how much overhead the UE 500 can afford.

The UE 550 may transmit 516 an acknowledgement (ACK) to the network node 510, which indicates that the UE has training data to transmit. The training data may be generated by the UE using a channel estimation algorithm, e.g. a Kalman filter (KF) algorithm.

Alternatively, the UE 550 may transmit a negative acknowledgement (NACK) indicating that the UE does not have training data. After receiving the NACK, the network node may transmit 518 a reference signal to UE so that the UE may generate some initial samples by using a known channel estimation algorithm 552. The channel estimation algorithm may be, for example, a Kalman filter (KF) algorithm. The reference signal (RS) may be, for example, a CSI-RS.

When the training data is available at the UE 550, the UE may divide 554 the training data into N parts or N batches or N subsets such that properties of data in each part or batch reflect distribution of the training data, e.g. the entire training data. The UE 550 might not feedback the entire training data to the network node 510, since it would cause large OTA overhead. N is an integer, and may depend on the size of the entire training data set or data availability. For example, if available training data set is very large, N may be high.

Instead of transmitting the entire training data available, the UE 550 transmits 520 a part of the training data, which may be the first part. The UE 550 transmits a part of the training data without transmitting the entire training data. Properties of data in the part of the training data reflect distribution of the training data as a whole. By transmitting a part of the training data, and not the entire training data, the OTA overhead is reduced. The part of the training data may comprise, for example, one batch of N batches. The part of the training data may comprise, for example, only one batch of N batches.

Size of a part of the training data may be a fraction, e.g. a small fraction, of the available training data. For example, a part or batch may be composed of at least 1000 samples, which may be suitable for training an ML model. For example, size of the part of the training data that is transmitted 520 to the network node, may be, for example, less than 20% of the training data. For example, size of the part, e.g. of one batch, may be 10% of the training data (entire data). For example, the size of the part of the training data that is transmitted may be so small that remarkable reduction of OTA overhead is achieved when compared to transmitting the full set of training data. For example, the division of the data into parts may be performed so that OTA overhead cost remains minimum, or OTA overhead costs will be reduced.

Sizes of the parts may vary. For example, size of the first part, which is transmitted at first, may be larger than the size of the one or more second parts that may be transmitted later. In other words, the first part may comprise more data samples than the second part. This may help the ML model to learn better in the beginning. For example, the size of the first part may be 10000 samples, and the size of the further parts may be smaller, e.g. 1000 samples. After transmission of the first part, the division of the training data may be inhomogeneous. For example, sizes of the may be 2000, 1000, 3000, etc.

The UE 550 may instruct the network node 510 to generate the remaining parts or batches of the training data.

After receiving the part of the training data, the network node 510 may generate 522 data samples based on the part of the training data. The generation of the data samples may be performed using a GAN. The network node may generate the rest of the batches by exploiting the reported part or batch to obtain a full set or desired set of training data. The full set of training data may be identical, or nearly identical, with the training data that is available at the UE. Thus, the network node 510 and the UE 550 may have the identical, or nearly identical, data for training ML models for a target goal at both ends. For example, the ML model may be a channel predictor for CSI feedback.

The network node 510 may compute a set of precoding matrix indices (PMIs) based on the generated data samples. Computation of the PMIs may be performed by exploiting a codebook. The codebook is known to the network node and the UE. PMIs may be used for verification of generated data as described below, which is beneficial, since the verification may be performed by using existing resources, e.g. by using a codebook.

The network node 510 may transmit 524 the set of PMIs to the UE 550. The network node 510 may transmit the corresponding indices of the generated data samples so that the UE may know the mapping between the PMIs and the data samples to be able to compare the PMIs received from the network node and the PMIs computed by the UE.

The network node 510 may also transmit a reliability counter C to count number of ACKs at the UE. For example, the network node may transmit a pre-set threshold, which defines a number of indices of the set of PMIs that is to be verified as correct at the UE.

The UE 550 may compute 555 PMIs based on the training data, which is available at its end. The UE may compute PMIs of part of the available training data, or of all of the available training data. Computing PMIs of part of the training data saves computation resources. Computing of the PMIs may take place already before, whenever the training data is available at the UE. Computation of the PMIs may be performed by exploiting a codebook. The codebook is known to the network node and the UE.

Then, the UE 550 may compare 556 the PMIs computed by itself and the PMIs received from the network node. The UE 550 is aware of the mapping between the PMIs. If the PMIs received from the network are correct based on the comparison, that is, if they are the same as or close enough to the PMIs computed by the UE, the UE may add an ACK to the counter C.

When the number of correct PMIs reaches the pre-set threshold value, or when the counter C reaches the pre-set threshold value, the UE 550 may transmit 526a an acknowledgement to the network node 510. This acknowledgement indicates to the network node 510 that the generated data at the network node is correct, and it can be used for training the AI or ML algorithm, for example, for channel prediction in case of CSI feedback. The network node has the full set or desired set of training data and may use this data for training a channel predictor, for example.

If the number of correct PMIs remains below a pre-set threshold, or in case the counter C does not reach the pre-set threshold, the UE 550 may transmit 526b another part (second part) of the training data to the network node 510. Counter C not reaching the pre-set threshold indicates that the data generated by the network node is not correct. Further parts or batches of data transmitted to the network node 510 may help the GAN at the network node 510 to generate better data.

Steps 522, 524, 556 and 526b may be repeated until the counter C reaches the pre-set threshold. The computation of PMIs 555 may also be repeated if the UE has not previously computed PMIs of all the training data available at its end. After receiving the other part of the training data, the network node may generate 522 data using the GAN based on the first transmitted part or batch and the further part or batch. If the counter C does not reach the threshold until all the batches, that is, the entire training data, are reported to the network node 510, it may be determined that use of GAN did not bring any advantage. If this is the case, the entire training data set may be transmitted to the network node 510 by the UE 550.

In the example of FIG. 5., the GAN is implemented at the network node 510. This may be a beneficial solution, if UE has not enough processing power for training a GAN, for example.

Figure 6:
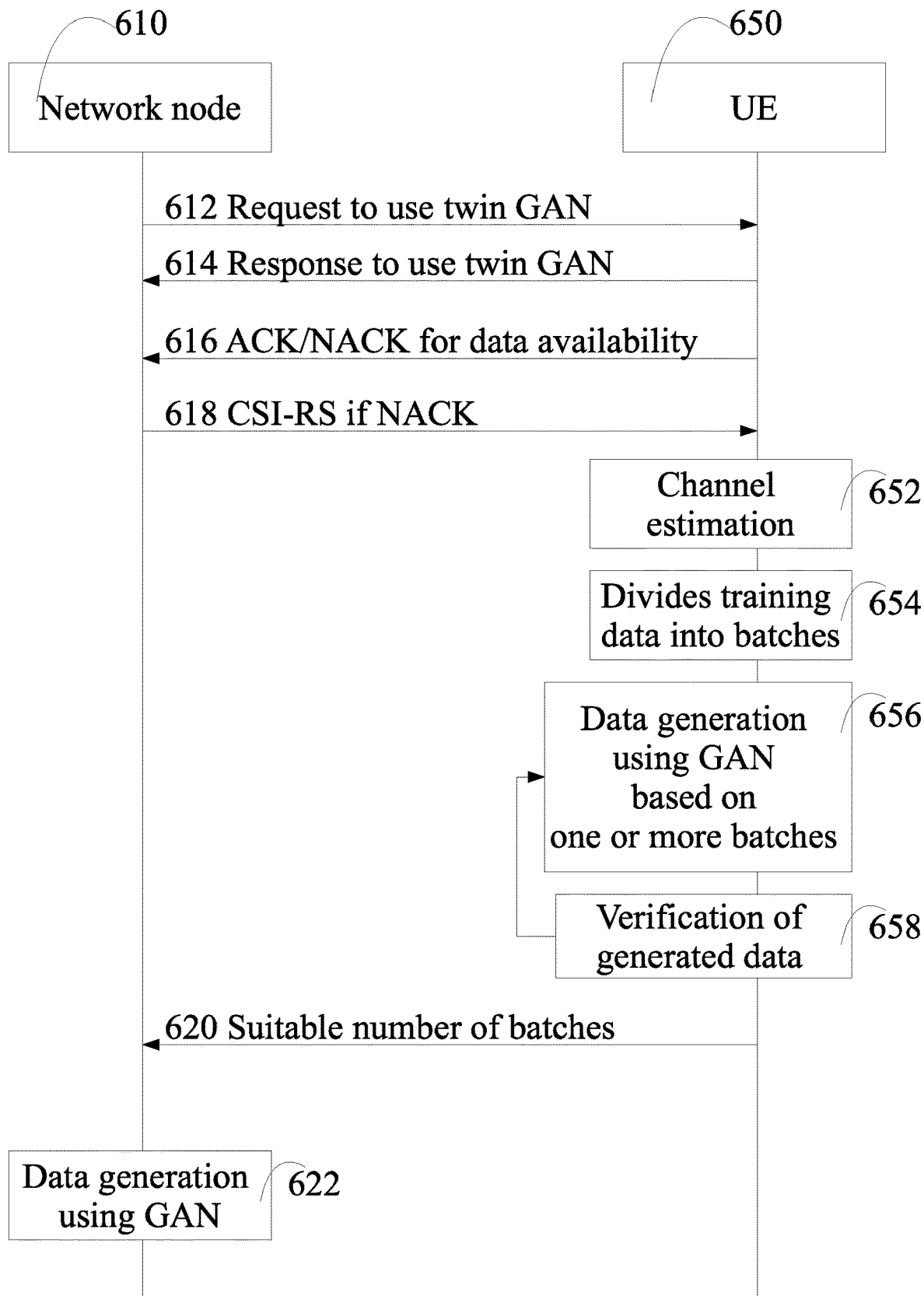
FIG. 6 shows, by way of example, signalling between entities.

According to another example, the GAN may be implemented at both ends, at the network node and at the UE, as described in the context of FIG. 6.

FIG. 6 shows, by way of example, signalling between entities. The network node 610 and the UE 650 may agree on using twin data augmentation algorithms, e.g. GAN, at both ends. Twin data augmentation algorithms have the same initialization parameters, e.g. weights. The network node 610 may transmit 612 a request to the UE 650 to use a twin data augmentation algorithm, e.g. twin GAN. The UE may transmit 614 a response to use twin GAN and initiate process at its end.

The UE 650 may transmit 616 either ACK or NACK for data availability. The UE may transmit an ACK if the UE has the initial samples to share with the network node. The UE 650 may transmit a NACK if the UE does not have the initial samples available. After receiving the NACK, the network node may transmit 618 a reference signal to UE so that the UE may generate some initial samples by using a channel estimation algorithm 652. The channel estimation algorithm may be, for example, a Kalman filter (KF) algorithm. The reference signal (RS) may be, for example, a CSI-RS.

When the training data is available at the UE 650, the UE may divide 654 the training data into N parts or N batches such that properties of data in each part or batch reflect distribution of the training data, e.g. the entire training data. The UE 650 might not feedback the entire training data to the network node 610, since it would cause large OTA overhead. N is an integer, and may depend on the size of the entire training data set.

The UE 650 may generate 656 data samples based on one more batches of the training data. The generation of the data samples may be performed using GAN. The GAN implemented at the UE 650 and the GAN implemented at the network node 610 may be twin GANs.

The UE 650 may verify 658 the generated data samples locally at the UE. The verification may be based on parameters such as mean square error (MSE) and/or cosine similarity. Verification of the data locally at the UE reduces signalling overhead.

The steps 656 and 658 may be iteratively repeated to determine a suitable or correct number of the one or more batches of the training data to be transmitted to the network node 610. The suitable number may be determined, for example, based on detecting that the discriminator loss has reached a steady state after using a suitable number of batches. The suitable number of the one or more batches may be determined, for example, based on detecting that desired data has been achieved with sufficient precision. This may be verified by comparing MSE and/or cosine similarity of the data generated using GAN with a desired data set. The desired data set is available at the UE and supposed to be generated at the network node by exploiting a suitable number of batches.

The UE 650 may transmit 620 the correct combination of batches to the network node 610. The part of the training data transmitted 620 to the network node 610 comprises the suitable number of the one or more batches of the training data. The UE 650 may instruct the network node 610 to generate the remaining batches or parts of the training data.

Because UE has already verified the data samples and the data that is transmitted to the network node is thus correct, the network node might not need to ask for more data from the UE to train the GAN. The network node might not either need to send the generated data samples to the UE for verification.

After receiving the part of the training data, the network node 610 may generate 622 data samples based on the received part of the training data. The generation of the data samples may be performed using a GAN, which is a twin of the GAN implemented at the UE 650. The network node may generate the rest of the batches by exploiting the reported part or batch to obtain a full set of training data. There is no need to verify the data as it has already been verified at the UE. The full set of training data may be identical, or nearly identical, with the training data that is available at the UE. Thus, the network node 610 and the UE 650 may have the identical, or nearly identical, data for training ML models at both ends. ML model may be, for example, a channel predictor for CSI feedback.

Figure 7:
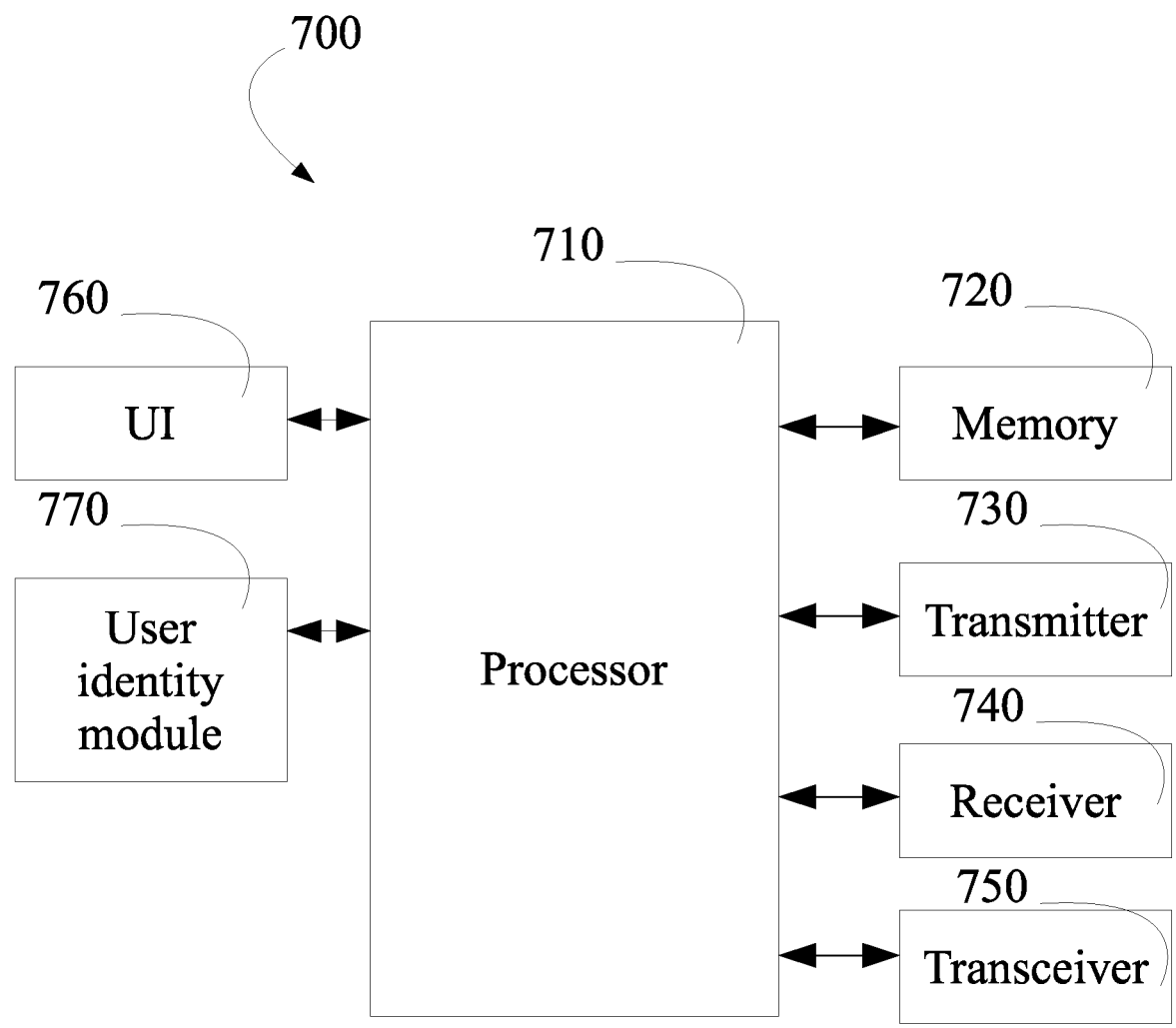
FIG. 7 shows, by way of example, a block diagram of an apparatus.

FIG. 7 shows, by way of example, an apparatus, which may be configured to perform at least the method of FIG. 3 and the embodiments thereof, or the method of FIG. 4 and the embodiments thereof. Illustrated is device 700, which may comprise, for example, a mobile communication device such as mobile 100 of FIG. 1 or network node 104 of FIG. 1, or the UE 550 of FIG. 5 or the network node 510 of FIG. 5, or the UE 650 of FIG. 6 or the network node 610 of FIG. 6. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core designed by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 770 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. An apparatus comprising:
   at least one processor; and
   at least one memory storing instructions that, when executed by the at least one processor, cause the apparatus at least to perform:
   receiving, from a network node, a request for training data for data augmentation algorithm;
   transmitting, to the network node, a first part of a plurality of parts of the training data, wherein properties of data in the first part of the training data reflect distribution of the training data;
   wherein the apparatus is caused to perform either:
   i) computing a first set of precoding matrix indices based on the training data;
   receiving, from the network node, a second set of precoding matrix indices computed based on data samples generated by the network node based on the first part of the training data transmitted to the network node;
   comparing the first set of precoding matrix indices and the second set of precoding matrix to verify the data samples generated by the network node; and
   based on determining that a number of indices of the second set of precoding matrix indices verified as correct remains below a pre-set threshold, transmitting a second part of the plurality of parts of the training data to the network node; or
ii) before transmitting the first part of the training data, the apparatus is caused to perform:
generating data samples based on one or more parts of the plurality of parts of the training data, wherein properties of data in the one or more parts reflect distribution of the training data;
verifying the generated data samples;
iteratively repeating generating the data samples and verifying the generated data samples to determine a suitable number of the one or more parts of the training data to enable generation of a desired set of training data; and
wherein the first part of the training data to be transmitted to the network node comprises the suitable number of the one or more parts of the training data.

2. The apparatus of claim 1, wherein the training data is generated by the apparatus using a known channel estimation algorithm.

3. The apparatus of claim 1, wherein the apparatus is further caused to perform:
transmitting, to the network node, an acknowledgement that the apparatus has training data available.

4. The apparatus of claim 1, wherein the apparatus is further caused to perform:
dividing the training data into the plurality of parts such that properties of data in the plurality of parts reflect distribution of the training data.

5. The apparatus of option i of claim 1, wherein the apparatus is further caused to perform:
based on determining that a number of indices of the second set of precoding matrix indices verified as correct reaches a pre-set threshold, transmitting an acknowledgement to the network node that the data samples generated by the network node are correct.

6. The apparatus of option i of claim 1, wherein the apparatus is further caused to perform:
receiving, from the network node, a third set of precoding matrix indices computed based on data samples generated by the network node based on the first part and the second part of the training data transmitted to the network node;
comparing the third set of precoding matrix indices and corresponding precoding matrix indices computed by the apparatus to verify the data samples generated by the network node; and
based on determining that a number of indices of the third set of precoding matrix indices verified as correct remains below a pre-set threshold, transmitting a further part of the one or more parts of the training data to the network node.

7. The apparatus of option i of claim 1, wherein the first part comprises more data samples than the second part.

8. The apparatus of option ii of claim 1, wherein the generating the data samples is performed using a generative adversarial network, GAN; and wherein the apparatus and the network node have agreed on using twin GAN.

9. An apparatus comprising:
at least one processor; and
at least one memory storing instructions that, when executed by the at least one processor, cause the apparatus at least to perform:
transmitting, to a user equipment, a request for training data for data augmentation algorithm;
receiving, from the user equipment, a first part of a plurality of parts of the training data, wherein properties of data in the first part of the training data reflect distribution of the training data;
wherein the apparatus is caused to perform either:
i) generating data samples based on the received part of the training data;
computing a set of precoding matrix indices based on the generated data samples;
transmitting the set of precoding matrix indices to the user equipment;
receiving a second part of the plurality of parts of the training data from the user equipment; or
ii) wherein the received part of the training data comprises a suitable number of parts of the training data generated and verified by the user equipment, wherein the suitable number of parts of the training data enables the apparatus to generate a desired set of data using the data augmentation algorithm.

10. The apparatus of claim 9, wherein the apparatus is further caused to perform:
receiving, from the user equipment, an acknowledgement that the user equipment has training data available.

11. The apparatus of claim 9, wherein the generating the data samples is performed using a generative adversarial network, GAN.

12. The apparatus of claim option i of claim 9, wherein the apparatus is further caused to perform:
transmitting a pre-set threshold defining a number of indices of the set of precoding matrix indices that is to be verified as correct.

13. The apparatus of option i of claim 9, wherein the apparatus is further caused to perform:
receiving an acknowledgement from the user equipment that the data samples generated by the network node are correct; and
training a machine learning model for a target goal with the data samples.

14. The apparatus of option i of claim 9, wherein the apparatus is further caused to perform:
generating further data samples based on the second part of the training data;
computing a further set of precoding matrix indices based on the further data samples;
transmitting the further set of precoding matrix indices to the user equipment; and
repeating the steps of generating, computing and transmitting until receiving an acknowledgement from the user equipment that the data samples generated by the network node are correct.

15. The apparatus of option ii of claim 9, wherein the apparatus and the user equipment have agreed on using twin GAN, and the apparatus is caused to perform:
generating the desired set of data based on the suitable number of parts of the training data; and
training a machine learning model for a target goal using the desired set of training data.

* * * * *